US005299267A

United States Patent [19]

Nakamura

[11] Patent Number: 5,299,267

[45] Date of Patent: Mar. 29, 1994

[54] OPERATING APPARATUS OF AN AUDIO MIXER

[75] Inventor: Ryuichi Nakamura, Kanagawa, Japan

[73] Assignee: Sony Corporation, Tokyo, Japan

[21] Appl. No.: 89,902

[22] Filed: Jul. 12, 1993

Related U.S. Application Data

[63] Continuation of Ser. No. 779,270, Oct. 18, 1991, abandoned.

[30] Foreign Application Priority Data

Oct. 26, 1990 [JP] Japan ............................ 2-111569[U]

[51] Int. Cl.⁵ ............................................. H04B 1/00

[52] U.S. Cl. ..................................... 381/119; 84/345

[58] Field of Search ................. 381/98, 103, 119, 104, 381/109; 84/345

[56] References Cited

U.S. PATENT DOCUMENTS 4,244,264 1/1981 Fellot .................................. 84/345
4,402,246 9/1983 Sekiguchi ............................ 84/345
4,479,240 10/1984 McKinley, Jr. ....................... 381/80
4,677,674 6/1987 Snyder .............................. 381/119
4,879,751 11/1989 Franks et al. ...................... 381/119
5,054,077 10/1991 Suzuki .............................. 381/119

FOREIGN PATENT DOCUMENTS 198999 10/1986 European Pat. Off. .
2140248 11/1984 United Kingdom .

OTHER PUBLICATIONS

Search Report dated Feb. 7, 1992.

*Primary Examiner*—Forester W. Isen
*Attorney, Agent, or Firm*—Lewis H. Eslinger; Jay H. Maioli

[57] ABSTRACT

Apparatus to widely change the control amount used for of mixing control in an audio mixer and to momentarily change a knob to a desired setting can be reproduced by selecting a mode in which the control amount for controlling the mixing of audio signals is continuously output and a mode in which the temporarily the stored control amount is output.

9 Claims, 4 Drawing Sheets

OPERATING APPARATUS OF AN AUDIO MIXER

This is a continuation of application Ser. No. 07/779,270, filed Oct. 18, 1991, now abandoned.

BACKGROUND OF THE INVENTION

1. Field of the Invention

The present invention relates to an operating apparatus of an audio mixer which is used for mixing audio signals.

2. Prior Art

There have been conventional audio signal editing mixers which can store the operations which have been performed by an operator and can subsequently reproduce these operations. For example, in a case in which the setting of an equalizer is carried out in a rehearsal, the operations of operating knobs of the equalizer which the operator performed are sorted and the operation knobs will be subsequently operated in accordance with the stored operation data upon going on the air so that the equalizing operations performed by the operator will be able to be reproduced.

However, settings cannot be widely changed as is done in the case when a momentary operation is performed from boost to cut on setting the equalizer in the audio mixer which can store the operations performed by an operator as mentioned above. That is, duplication of the momentary operation of operation knobs of the equalizer from boost to cut as performed by an operator per se is impossible. An operation to stop the operation knob of the equalizer in a desired position also cannot be performed. In other words, momentary adjusting of setting of an equalizer from boost to cut and an operation to momentarily stop the operation knobs in a desired position cannot be reproduced on going upon the air. In the conventional audio mixer, the process from boost to cut is all stored.

The present invention was made under the above mentioned circumstances.

It is an object to provide an operating apparatus of an audio mixer, which is capable of storing and reproducing an operation to largely change the setting of mixing and an operation to stop an operation knob in a desired position.

SUMMARY OF THE INVENTION

In order to accomplish the above mentioned object, the present invention provides an operating apparatus of an audio mixer comprising an operating device for continuously adjusting the control amount for controlling the mixing of audio signals, storing means for temporarily storing the control amount which has been adjusted by the operating device, and switching means selecting either one of a mode in which the control amount adjusted by the operating device is continuously outputted and a mode in which the control amount is temporarily stored and the stored control amount is outputted.

It is preferable that said switching means be provided so that it is associated with said operating device and it is more preferable that the modes be changed in association with operation of the operating device.

Since the apparatus can be switched to a mode in which the control amount which has been adjusted by the operating device is temporarily stored and the stored control amount is outputted, the adjusting amount is prohibited from being stored in this mode while an adjustment amount is changed to another adjustment amount. Accordingly, reproduction to momentarily change an adjustment amount to another adjustment amount for setting of mixing is possible.

DESCRIPTION OF THE EMBODIMENTS

Now an embodiment of the present invention will be described with reference to the drawings.

Figure 1:
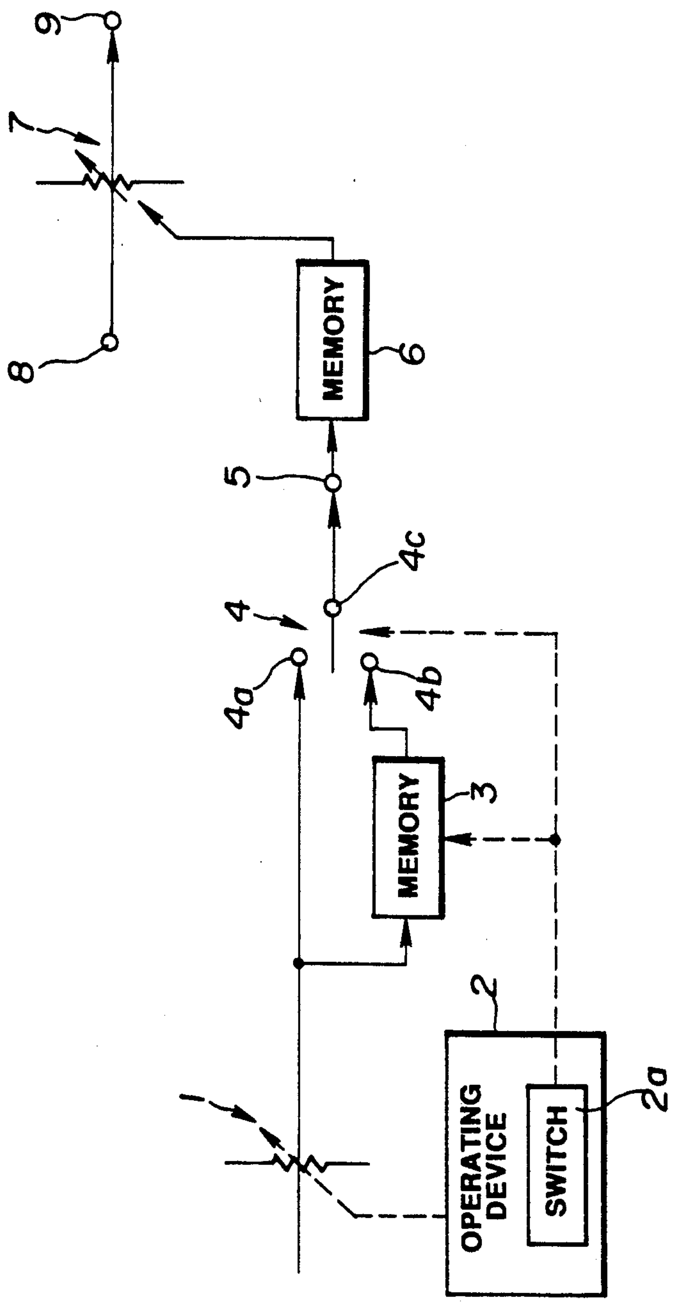
FIG. 1 is a schematic block diagram of an embodiment of an operation apparatus of the present invention.

Referring to FIG. 1, there is shown a schematic block diagram of an apparatus for operating an audio mixer which is an embodiment of the present invention.

The apparatus for operating the audio mixer of the present embodiment shown in FIG. 1 comprises an operating device for continuously and variably adjusting the amount of control for controlling the mixing ratio of audio signals and a memory 3 for temporally storing data of the control amount from a control amount adjusting element 1 which is adjusted by the operation device 2, a mode selecting switch 2*a* for switching the operation mode between a mode in which the control amount data which is adjusted by the operating device 2 is continuously outputted (hereinafter referred to as continuous output mode) and a mode in which the control amount data is temporarily stored in the memory 3 and the stored control amount data is outputted (hereinafter referred as noncontinuous output mode) and a switch 4 for selecting an output. In the present embodiment, mixing control such as setting of an equalizer is carried out. The switch 2*a* for selecting the modes is provided so that it is related with the operation of the operating element 2. The switch 2*a* performs a switching operation between the continuous and noncontinuous output modes in response to the operation of the operating device 2. In particular, the mode selecting switch 2*a* can be turned on or off while the control amount is adjusted by the operating element 2 using only one hand.

Figure 2:
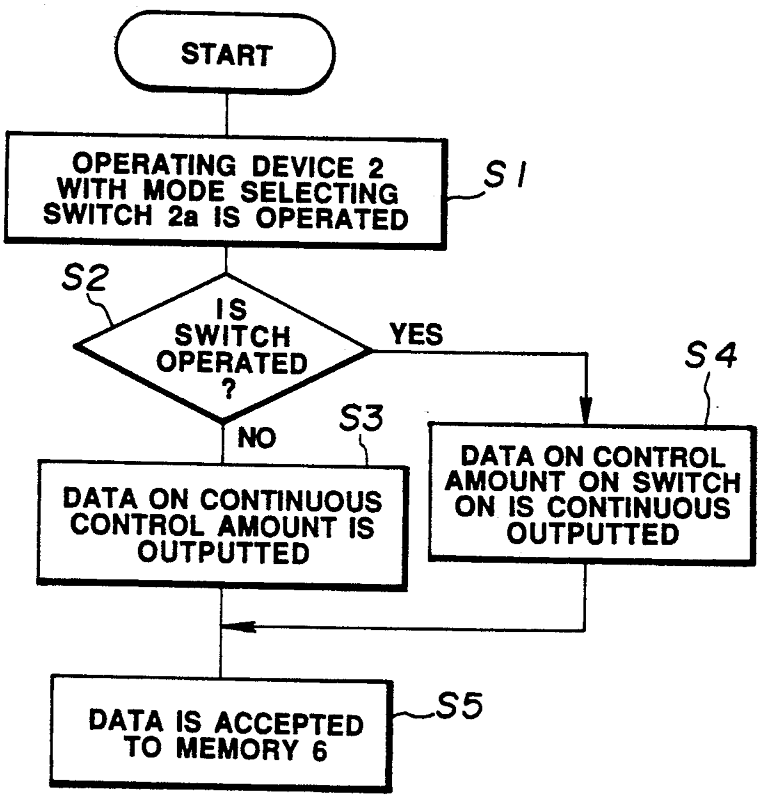
FIG. 2 is a flowchart showing an operation in the apparatus of the present embodiment.

In FIG. 2, an audio signal is supplied as a mixing adjusting element 7 of the audio mixer via an input terminal 8. The mixing adjusting element 7 is controlled by a mixing control signal supplied from the operating apparatus of the present embodiment. The mixing control signal i s generated f rom a memory 6 in response to an output of the control amount adjusting element 1 (that is, the control amount data), which is continuously and variably adjusted by the operating device 2. The audio signal which is adjusted by such mixing adjusting element 7 is outputted from an output terminal 9.

The control amount data from the control amount adjusting element 1 is supplied to the memory 3, in which the control amount data from the control amount adjusting element is temporarily stored. The signal read from the memory 3 is fed to a terminal 4*b* of the output switch 4. A control amount data from the control amount adjusting element 1 is directly supplied to the other terminal 4a of the output switch 4.

The mode selecting switch 2a of the operating device 2 is operated by an operator. The operator can select one of the continuous and noncontinuous output modes. In other words, the operator can select the continuous output mode in which the control amount data from the control amount adjusting element 1 is continuously output unchanged and can select the noncontinuous output mode in which the control amount data is temporally stored in the memory 3 and the stored control amount data is read out. A switch control signal which is subsequently generated by the switching operation of the mode selecting switch 2a is fed to the memory 3 and the output selecting switch 4. In the memory 3, write and read of the control amount data is controlled in response to the switching control signal. Switching of the output selecting switch 4 is controlled in response to the switching control signal. If the operator switches the mode selecting switch 2a of the operating element 2 to the noncontinuous output mode, the memory 3 is controlled in response to a switching control signal corresponding to the noncontinuous output mode so that write is prohibited and the data currently store in the memory 3 is continued to be read out (only the recently stored data is continued to be read out. Simultaneously with this, the output selecting switch 4 is switched so that the input terminal 4b is connected with the output terminal 4b. The data from the memory 3 is fed to the memory 6. The control amount set by the control amount adjusting element 1 can be of course adjusted even in the noncontinuous output mode. If the operator selects the continuous output mode, the output selecting switch 4 is switched in response to the switching control signal corresponding to the continuous output mode so that the input terminal 4a is connected with the output terminal 4c. The control amount data from the element 1 is directly fed to the memory.

A mixing control signal depending upon the control amount data which is switched in response to the mode selection by the operator is outputted f rom the memory 6 by the operation as mentioned above. This causes the mixing adjusting element 7 be adjusted in the continuous output mode depending upon the control amount data which is adjusted by the operator 2. In the incontinuous output mode, adjustment of the mixing adjusting element 7 is continued depending upon the control amount data set at the time when the apparatus is brought into the noncontinuous output mode. Accordingly, the adjustment amount of the mixing adjusting element 7 is not changed even if the control amount is changed by manipulating the operating device 2 in the noncontinuous output mode. When the mixer is switched into the continuous output mode, the adjustment amount of the mixing adjusting element 7 is determined by the current control amount data from the control amount adjusting element 1. Accordingly, the adjustment amount in the mixing adjusting element 7 is desired to be momentarily changed from the adjustment amount in the noncontinuous output mode to the current adjustment amount.

When boost is wanted to be momentarily changed to cut on setting of, for example, an equalizer of the audio mixer , the setting can be widely changed if the setting is changed in the incontinuous output mode and thereafter the noncontinuous output mode is changed to the continuous output mode. In other words, a momentary adjusting operation of the setting of, for example, an equalizer from boost to cut can be reproduced on upon going on the air. Similar operation makes it possible to perform an operation for momentarily stopping an operation knob of the equalizer in a desired position.

Functions of the memory 3 and the output selecting switch 4 can be incorporated in the memory 6. In this case, the memory 6 is constantly supplied with the data on the amount of control and is supplied with a switching control signal from the operating device 2. That is, reading of a mixing control signal from the memory 6 is controlled in response to the switching control signal. In the noncontinuous output mode, the mixing control signal is continued to be read based upon the data on the amount of control at the time when the operation apparatus is brought into the noncontinuous output mode. In the continuous output mode, the mixing control signal is based upon the data on the amount of control supplied to the memory 6 being continuously read.

A flow chart for explaining the operation of the above mentioned embodiment is shown in FIG. 2.

In this flow chart, in step S1, the operating device 2 with the mode selecting switch 2a is operated by an operator. In step S2, determination whether the mode selecting switch 2a is operated or not is made. If the switch is turned off (No), the program step proceeds to step 3. If the switch is turned on, the program step proceeds to step 4. In step 4, noncontinuous control amount data, that is, only data on control amount depending upon the operation of the operating device 2 when the switch is turned on is continued to be outputted. After the steps S3 and S4, the program step proceeds to step 5. In step 5, the control amount data is accepted to the memory 6. The mixing control signal depending upon the control amount data output from the memory 6 in interest. The above mentioned determination of the mode selecting and control operation such as read/write of the memory 3 is carried out by a so-called CPU (central processing unit) not shown.

Figure 3:
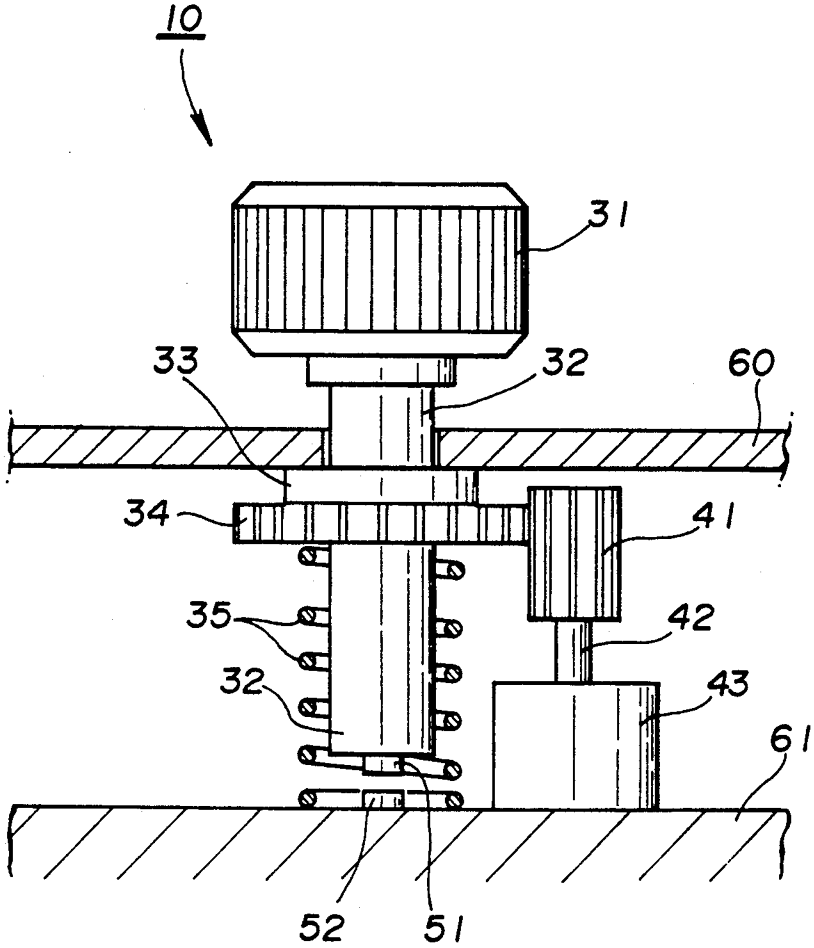
FIG. 3 is a structural view showing an operation device, a mode selection switch and a control amount adjusting element of the apparatus of the embodiment.

The structure of the operating device 2 with the mode selecting switch 2a and control amount adjusting element 1 is shown in FIG. 3. FIG. 3 is a structural view of a variable resistor 10 with a switch in which the operating device 2 with the mode selecting switch 2a and the control amount adjusting element 1 are operationally connected with each other.

In FIG. 3, a rotary knob 31 which is grasped with the fingers by an operator for rotating is secured to a shaft 32 which passes through a chassis 60 of the variable resistor 10 with a switch and is journalled on a through-hole of the chassis 60. A stopper 33 for restricting the movement amount (in a direction normal to the rotational direction) when the rotary knob 31 is pressed by a spring 35 is provided around the shaft 32. A gear 34 which is rotated by the rotation of the shaft 32 is provided around the shaft 32. A shaft 42 is secured at one end thereof to a gear 41 a toothed portion having a length larger than the above mentioned movement amount of the gear 34 in a direction normal to the rotational direction while the gear 41 is meshed with the gear 34. The shaft 42 i s provided with a circuit unit 43 serving as the control amount adjusting element 1 for converting the rotational amount of the shaft 42 associated with the rotation of the gear 41 into an electrical signal. A contact 51 which is disposed at the tip end (opposite to the rotary knob) of the shaft 31 and a contact disposed on the base bottom 61 of the chassis 60, facing the tip end of the shaft constitute a switch portion serving as the mode selecting switch 2a. Accordingly, the spring 35 acts to enlarge the space between the gear 34 and the base bottom 61 of the chassis 60 to normally separate the contact 51 from the contact 52.

Figure 4:
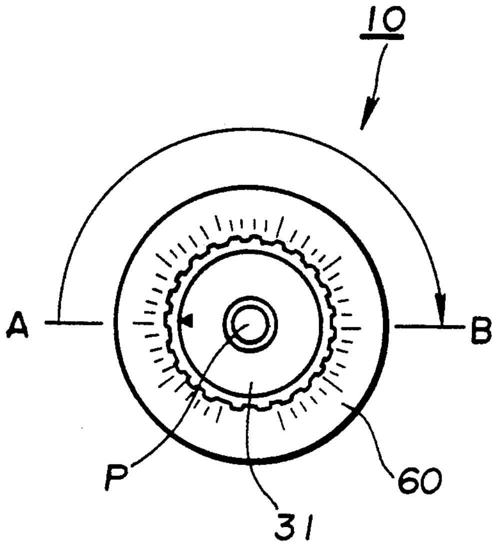
FIG. 4 is a partial schematic plan view showing a variable resistor with switch.

In other words, in the variable 10 with a switch in FIG. 4, rotation of the rotary knob 31 is transmitted to the circuit unit 42 via the shaft 32, the gears 34, 41 and the shaft so that the rotational amount of the knob 31 is converted into the control amount data. The shown portion (contacts 51 and 52) which is normally brought into the continuous output mode by the spring 35 is turned on by depressing the rotary knob,,31. At this time, the apparatus is switched into the noncontinuous output mode.

A partial plan view of the variable resistor 10 with a switch is shown in FIG. 4.

In FIG. 4, the variable resistor 10 with a switch is capable of continuously changing the control amount in the control amount adjusting element 1 by changing the actuation amount (for example, rotational amount) of the rotary knob 31. The variable resistor 10 with the switch is a variable resistor with a socalled push-on switch as shown in FIG. 3. The variable resistor 10 has a function switch which is turned on by depressing the rotary knob 31 and is turned off by releasing the knob 31. The apparatus is brought into the noncontinuous and continuous output modes by turning the variable resistor with a switch on and off, respectively. Accordingly, when the switch is turned on, the control amount is not changed even by rotating the rotary knob 31. Alternatively, a variable resistor with the switch 10 which brings the apparatus into the noncontinuous and continuous output modes by depression of the rotary knob 31 once and twice, respectively or a variable resistor which brings the apparatus into the noncontinuous and continuous output modes by touching a predetermined portion of the rotary knob 31 (so-called touch switch is provided on P in FIG. 4) and by unhanding (or retouching) the predetermined portion, respectively is possible.

Figure 5:
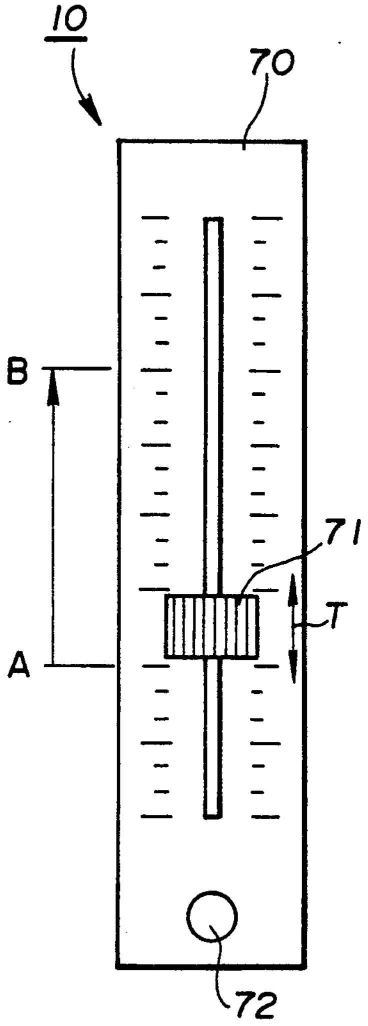
FIG. 5 is another embodiment of a variable resistor with a switch.

FIG. 5 shows another embodiment of the variable resistor with a switch. In this embodiment, the movement amount of the slides 71 which is movable in a direction of an arrow T corresponds to the control amount of the control amount adjusting element 1 In other words, continuous control amount data is obtained by moving the slide 71 from a position A to position B in FIG. 5. The apparatus is switched to the noncontinuous output mode by depressing a switch 72 which is a mode selecting switch. Since the subsequent operation is similar to that of the former embodiment, description of the subsequent operation is omitted.

In the embodiment of FIG. 5, mixing control depending upon the movement amount of the slide 71 is performed in both continuous and noncontinuous output modes as is similar to the former embodiment.

As mentioned above, the operating device of the audio mixer of the present embodiment controls the continuous output mode, in which the control amount which is adjusted by the operating device 2 for continuously adjusting the control amount for mixing control of the audio signals is output noncontinuous and the output mode, in which the control amount is temporally stored in the memory 3 and the stored control amount is output by the mode selecting switch 2a and the output selecting switch 4 so that an operation in which setting of mixing in the audio mixer is largely changed or an operation for momentarily stopping the operation knob at a desired point can be reproduced.

Accordingly, an operation to largely change the setting that is similar to the operation to momentarily change boost to cut on setting of, for example, the equalizer of the audio mixer can be reproduced. That is, operation to momentarily adjust the setting of an equalizer from boost to cut upon going on the air can be reproduced and an operation to stop the operation knob of the equalizer in a desired position can be reproduced.

In the operation apparatus of the audio mixer of the present invention, an operation to widely change the control amount (setting of mixing) of mixing control in an audio mixer and an operation to momentarily change to a desired setting point of can be reproduced by alternatively selecting one of a mode in which the control amount for controlling the mixing of audio signals is continuously output and a mode in which the control amount is temporarily stored and the stored control amount is output.

What is claimed is:

1. An operating apparatus of an audio mixer comprising:

an operating device for continuously adjusting a control amount that controls mixing of audio signals;

storing means for temporarily storing the control amount adjusted by the operating device; and switching means electrically connected to said operating device and to said storing means, said switching means having at least two states and including a mode control switch mounted on said operating device and being operable by an operator to either of said states to enable the operator to select either a mode in which the control amount adjusted by the operating device is output directly for controlling mixing of the audio signals or a mode in which the control amount temporarily stored in said storing means is output for controlling mixing of the audio signals, said mode control switch also controlling said storing means in read/write modes, so that in the mode in which the control amount is output directly said storing means is in a write mode for temporarily storing the control amount adjusted by the operating device.

2. An operating apparatus of an audio mixer according to claim 1 in which said operating device includes a variable resistor with a rotary knob that provides the control amount by converting a rotational amount of the rotary knob into an electrical signal.

3. An operating apparatus of an audio mixer according to claim 2 in which said storing means temporarily stores said control amount obtained by said operating device converting the rotational amount of said rotary knob into said electrical signal.

4. An operating apparatus of an audio mixer according to claim 1 in which said operating device includes a variable resistor and a reciprocating slider that provides said control amount by converting the movement amount of the reciprocating slider into an electrical signal.

5. An operating apparatus of an audio mixer according to claim 4 in which said storing means temporarily stores said control amount obtained by said operation device converting the movement of said reciprocating slider into an electrical signal.

6. An operating apparatus of an audio mixer comprising:

storing means;

an operating device for continuously adjusting a control amount that controls storing the control amount adjusted by the operating device; and switching means connected to said operating device and said storing means for selecting wither a mode in which the control amount adjusted by the operating device is output or a mode in which the control amount temporarily stored in said storing means is output;

in which said switching means is provided on said operating device and performs the mode selection in association with operation of said operating device;

further comprising a rotary knob of said operating device and means for mounting said rotary knob of said operating device for movement in a direction perpendicular to the rotational direction of the knob and wherein said switching means selects the modes depending upon the movement of the rotary knob in said perpendicular direction.

7. An operating apparatus of an audio mixer comprising:

storing means;

an operating device for continuously adjusting a control amount that controls storing the control amount adjusted by the operating device; and switching means connected to said operating device and said storing means for selecting either a mode in which the control amount adjusted by the operating device is output or a mode in which the control amount temporarily stored in said storing means is output;

in which said operating device includes a variable resistor with a rotary knob that provides the control amount by converting a rotational amount of the rotary knob into an electrical signal;

further comprising means for mounting said rotary knob of said operating device for movement in a direction perpendicular to the rotational direction of the knob and wherein said switching means selects the modes depending upon the movement of the rotary knob in said perpendicular direction.

8. An operating apparatus of an audio mixer comprising:

storing means;

an operating device for continuously adjusting a control amount that controls storing the control amount adjusted by the operating device; and switching means connected to said operating device and said storing means for selecting either a mode in which the control amount adjusted by the operating device is output or a mode in which the control amount temporarily stored in said storing means is output;

in which said switching means is provided on said operating device and performs the mode selection in association with operation of said operating device; and in which said switching means is provided on a predetermined portion of said rotary knob of said operating device and is operated by contact with a finger of an operator.

9. An operating apparatus of an audio mixer comprising:

storing means;

an operating device for continuously adjusting a control amount that controls storing the control amount adjusted by the operating device; and switching means connected to said operating device and said storing means for selecting either a mode in which the control amount adjusted by the operating device is output or a mode in which the control amount temporarily stored in said storing means is output;

in which said operating device includes a variable resistor with a rotary knob that provides the control amount by converting a rotational amount of the rotary knob into an electrical signal;

in which said switching means is provided on a predetermined portion of said rotary knob of said operating device and is operated by contact with a finger of an operator.

* * * * *

UNITED STATES PATENT AND TRADEMARK OFFICE

CERTIFICATE OF CORRECTION

PATENT NO. : 5,299,267
DATED : March 29, 1994
INVENTOR(S) : Ryuichi Nakamura

It is certified that error appears in the above-indentified patent and that said Letters Patent is hereby corrected as shown below:

On the title page item [57],
In the Abstract, line 2, delete "of"
line 6, change "and" to --or--
same line, delete "the" second occurrence
Col. 1, line 24, after "However," insert --the--
line 38, after "all" insert --that can be--
Col. 2, line 20, after "Now" insert --,--
line 56, change "i s generated f rom" to --is generated from--
Col. 3, line 12, after "is" insert --subsequently--
line 13, delete "subsequently"
line 26, before "recently" insert --most--
same line, after "out" insert --)--
line 41, change "f rom" to --from--
line 43, after "7" insert --to--
lines 45 & 46, change "incontinuous" to --noncontinuous--
line 65, change "incontinuous" to --noncontinuous--
Col. 4, line 1, delete "on"
line 18, after "read" insert --out--
line 34, change "output" to --is outputted--
line 38, after "unit)" insert --,--
line 56, after "41" insert --including--
line 60, change "i s" to --is--

UNITED STATES PATENT AND TRADEMARK OFFICE

CERTIFICATE OF CORRECTION

PATENT NO. : 5,299,267
DATED : March 29, 1994

INVENTOR(S) : Ryuichi Nakamura

It is certified that error appears in the above-indentified patent and that said Letters Patent is hereby corrected as shown below:

Col. 5, line 4, after "variable" insert --resistor--
same line, after "switch" insert --shown--
line 6, change "42" to --43--
line 7, after "shaft" insert --42--
same line, after "the" third occurrence, insert --rotary--
line 8, change "shown" to --switch--
line 11, delete ",,"
line 21, change "socalled" to --so-called--
line 42, change "slides" to --slider--
line 44, after "1" insert --.--
line 46, change "slide" to --slider--
line 53, change "slide" to --slider--
line 61, after "output" insert --, and the--
same line, after "noncontinuous" delete "and the"
Col. 6, line 13, delete "of"

Col. 7, line 5, change "wither" to --either--
Col. 8, line 38, after "signal;" insert --and--

Signed and Sealed this

Twenty-third Day of January, 1996

Attest:

BRUCE LEHMAN

Attesting Officer

*Commissioner of Patents and Trademarks*